United States Patent [19]

Covert

[11] Patent Number: 5,038,909
[45] Date of Patent: Aug. 13, 1991

[54] CARTON ACCUMULATOR

[76] Inventor: William J. Covert, P.O. Box 365, Berlin, N.J. 08009

[21] Appl. No.: 395,257

[22] Filed: Aug. 17, 1989

[51] Int. Cl.⁵ .................................................. B65G 1/00
[52] U.S. Cl. .................................................. 198/347.3
[58] Field of Search .............................. 198/347, 347.3

[56] References Cited

U.S. PATENT DOCUMENTS

| | | | |
|---|---|---|---|
| 4,018,325 | 4/1977 | Rejsa | 198/347 |
| 4,220,236 | 9/1980 | Blidung et al. | 198/347.3 |
| 4,560,057 | 12/1985 | Applegate et al. | 198/347 |
| 4,711,336 | 12/1987 | Mattei | 198/347 |

Primary Examiner—Joseph E. Valenza
Assistant Examiner—Keith L. Dixon
Attorney, Agent, or Firm—Eugene E. Renz, Jr.

[57] ABSTRACT

A device for accumulating objects carried between an up stream location and a down stream location, including a frame mounting a conveyor to define a path through the device from an entrance to an exit. The device includes a magazine on the frame and contains a plurality of chambers, the chambers being movable to position each chamber in operable relationship with the path. The chambers each include a plurality of object nests individually sized to each carry an object into or out of the path when the chamber is moved. Also provided are stop operable to regulate the flow of objects along the path to selectively position objects for accumulation by the magazine.

25 Claims, 4 Drawing Sheets

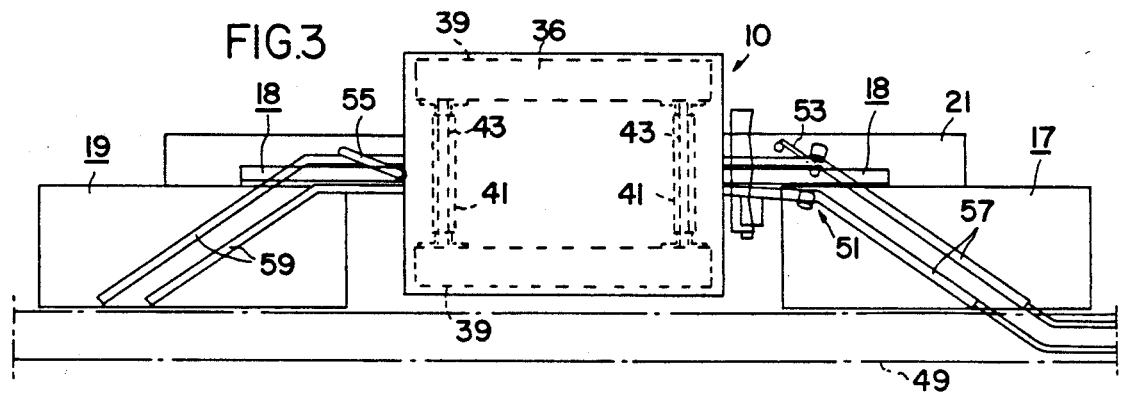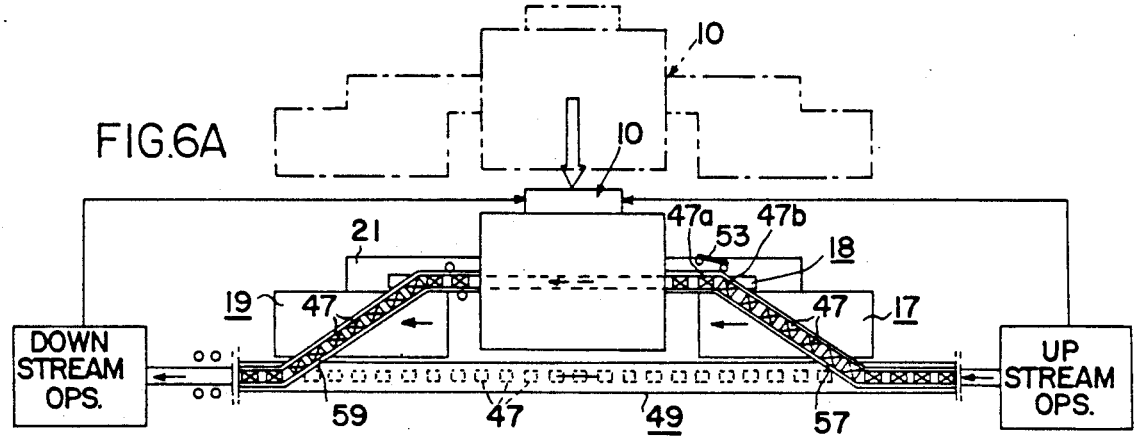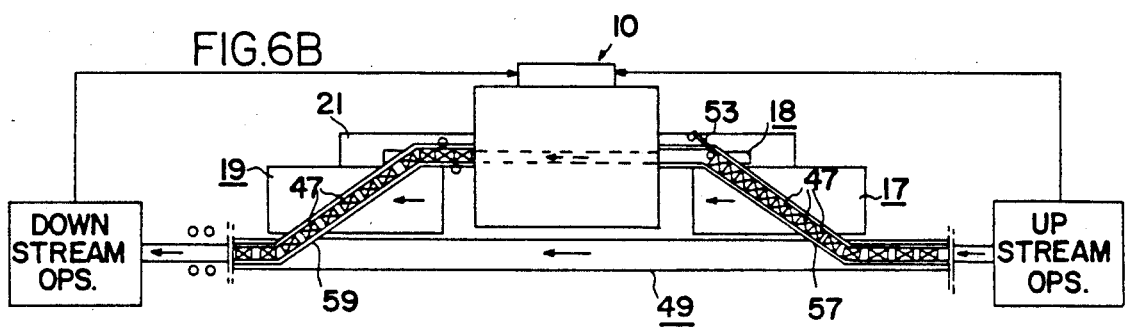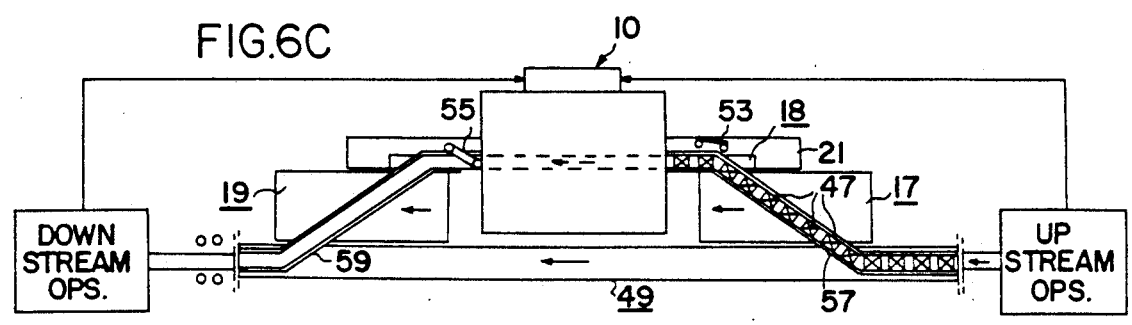

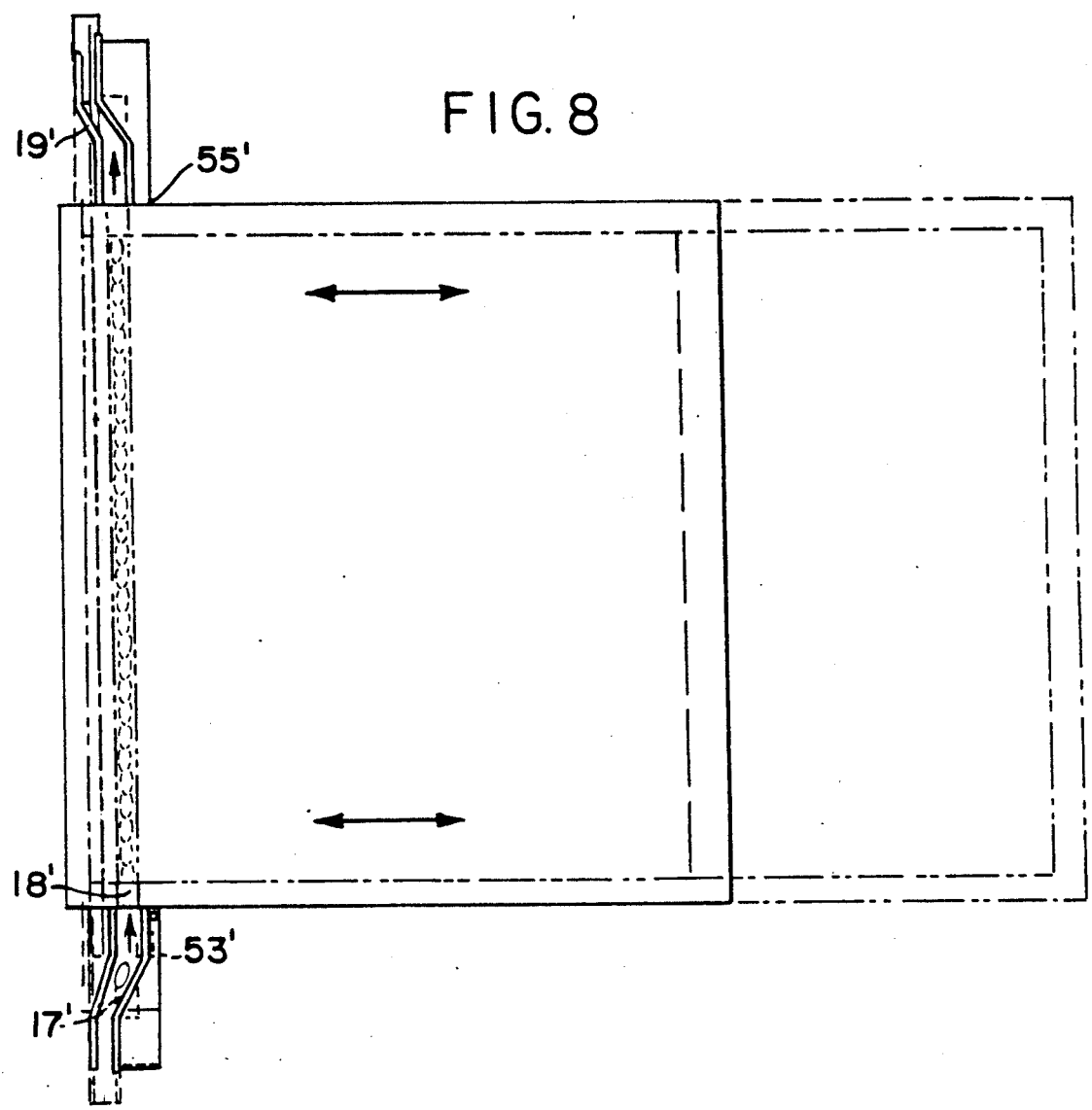
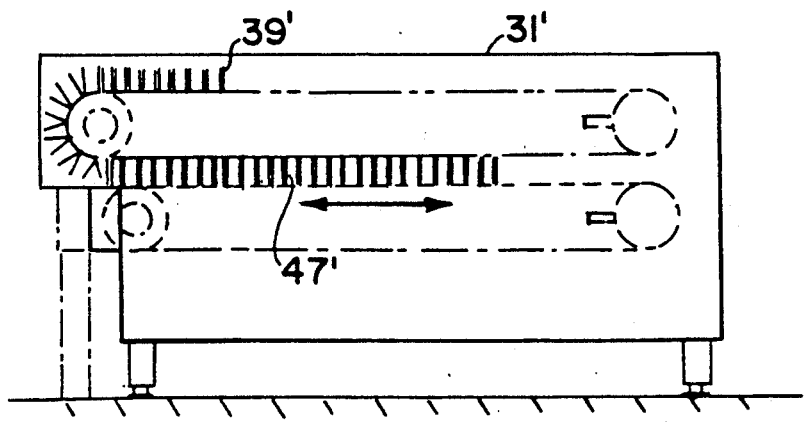

CARTON ACCUMULATOR

FIELD OF THE INVENTION

The present invention relates to devices used to accumulate objects which are carried between an up stream location and a down stream location by a conveyor. More particularly, the invention relates to a device which is capable of removing, storing and returning objects from a conveyor line in the most efficient manner.

BACKGROUND OF THE INVENTION

The efficient packaging of products has become a major factor in the profitability of many product lines. Items such as food stuffs, for example, are automatically filled in packages under sanitary conditions. These filled packages are then transported to what are generically know as "case machines". Case machines are those machines which take a plurality of individual packages and place them in cases for shipment in the distribution process. Case machines, however, are notorious for down time. Mechanically packing cardboard boxes into larger cardboard boxes requires precise adjustment of the case machine, particularly since tolerances are tight and paper products, at least, cannot withstand excessive force.

Nevertheless, efficient operation of a manufacturing facility requires that the up stream machinery continue to operate without interruption. It is undesirable to stop and start filling or packaging operations because restarting the case machine is difficult. In addition, continuous operation will produce more product, since the down time for each machine would not be linked to, or added to, down time for other units.

In the past case machines and other down stream machines have been linked close together requiring both to stop when either one does. In an attempt to provide some accumulation the operations have been spaced apart with the connecting conveyor providing brief accumulations. Thus if operation of the down stream machine is interrupted, the up stream machine will merely add additional objects to the conveyor until the down stream machine is repaired. In some instances, serpentine conveyor paths have been used to receive product continuously from the up stream operation. Continuously adding more product to a serpentine conveyor which is not feeding to the down stream unit causes a continuous buildup of pressure on the product. If the coefficient of friction is 0.25, which is a reasonable value for paper products sliding on conveyor belts, 25% or ¼ of the weight of the total number of products is pushing on those front few packages which have been stopped while the case machine or other down stream unit is being repaired.

One method has been proposed for accommodating a collection of articles being produced up stream while the down stream processing unit is not in operation. These devices, generally called accumulators, are designed to pick up the articles which pass along on a conveyor by lifting the edges of the container which extend over the sides of the conveyor. This method has two distinct disadvantages. First there is often little space on the object for the lifting mechanism to engage, and thus the possibility exists that objects will not be caught by the lifting mechanism. Second while some objects such as packaged frozen pizzas are flat and intended to be shipped in containers which are relatively long and wide compared to the height of the package, many products, such as, for example, breakfast cereals, specialty crackers, and the like have as their longest dimension the height of the package. Consequently, with these products vertical lifting of the package is limited by the ceiling height in the assembly room and little accumulation is available.

Accordingly, it is an object of the present invention to provide a device which is suitable for accumulating discrete objects which are carried between an up stream location and a down stream location while remedying the deficiencies of the prior art. Specifically, it is an object of this invention to eliminate the need for long, serpentine conveyors which use an inordinate amount of floor space. It is also an object of this invention to provide a machine for accumulating those objects in a machine which is suitable for use where floor space and ceiling height would otherwise limit the use of an accumulating type device.

SUMMARY OF THE INVENTION

It has now been discovered that the above and other objects of the present invention can be accomplished in the following manner. Specifically a device for accumulating discrete objects which are carried between an up stream location and a down stream location has now been discovered. More particularly, the device includes a frame for mounting a conveyor means to define a path through the device from an entrance to an exit. Also provided is a magazine means mounted on said frame and containing a plurality of chambers. The plurality of chambers are movable to sequentially position each chamber in operational relationship with the path. Each of the chambers includes a plurality of object nests which are individually sized so that each nest carries an object into or out of said path when the said chamber is moved into or out of operable relationship with said path. Finally, the device includes stop means which are operable to regulate the flow of objects along said path to selectively position objects for accumulation by said magazine means.

In its simplest form, the device of the present invention functions as an accumulator to automatically store when down stream is stopped, and retrieve packages from a through conveyor as required when the up stream is stopped. Also, the device can insert or remove groups of stored product into the line with both up stream and down stream operations running when one unit operates faster than the other unit.

In a preferred embodiment, the device of the present invention can function as a first in-first out accumulator device. The device is optionally a stand-a-lone machine in this or other embodiments, which can be placed along side an existing conveyor which is transporting packages from an up stream machine to a down stream machine. The device includes an indexing means which rotates the location of the specific chambers so that the first loaded chambers are positioned adjacent the path so as to be first to be unloaded upon demand.

The nests themselves are preferably u-shaped members facing the path when the particular carrier is in position. The u-shaped member moves the object in a radial path off one side of the path until the nest and product are generally parallel to the floor. Then the nests and objects are lifted vertically as each succeeding carrier is brought into position for filling. The entire magazine of carriers is adapted to be rapidly indexed, to bring the first filled nests to the top of the vertical height and radially around to the other side of the magazine as the path of the carriers defines a loop.

Since the carriers reorient the product on its side and since the magazine provides carriers up one side over the top and down the other side many more products can be accumulated.

BRIEF DESCRIPTION OF THE DRAWINGS

These and other objects of the present invention and the various features and details of the operation and construction thereof are hereinafter more fully set forth with reference to the accompanying drawings, where:

FIG. 3 is a plan view of the accumulator shown in FIGS. 1 and 2.

FIGS. 6a-6c are schematic planned views illustrating the various modes of operation of one embodiment shown in FIGS. 1-5.

FIG. 7 is a schematic side elevational view of a horizontally disposed accumulator device, illustrating a modification of the vertically disposed accumulator shown in FIGS. 1-6c.

FIG. 8 is a schematic plan view of the horizontally accumulator shown in FIG. 7.

DETAILED DESCRIPTION OF THE PREFERRED EMBODIMENT

Figure 2:
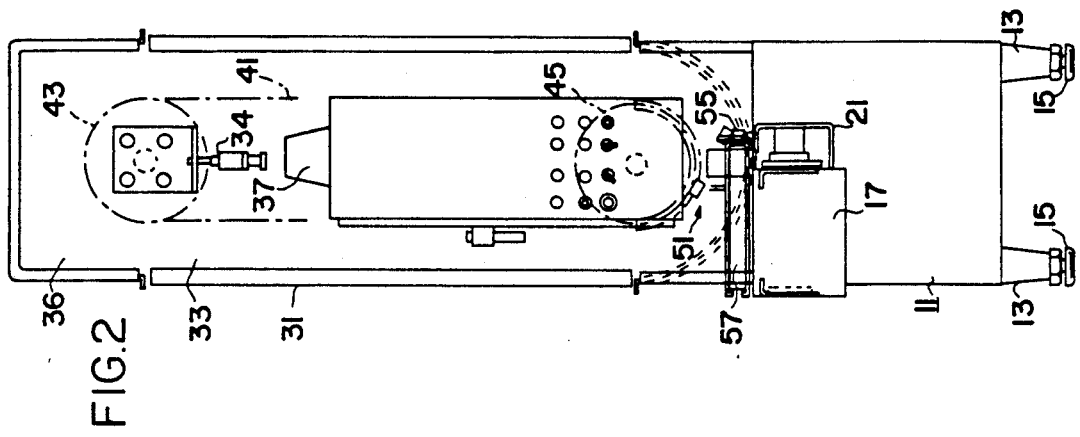
FIG. 2 is a right side elevational view of the device shown in FIG. 1.
Figure 1:
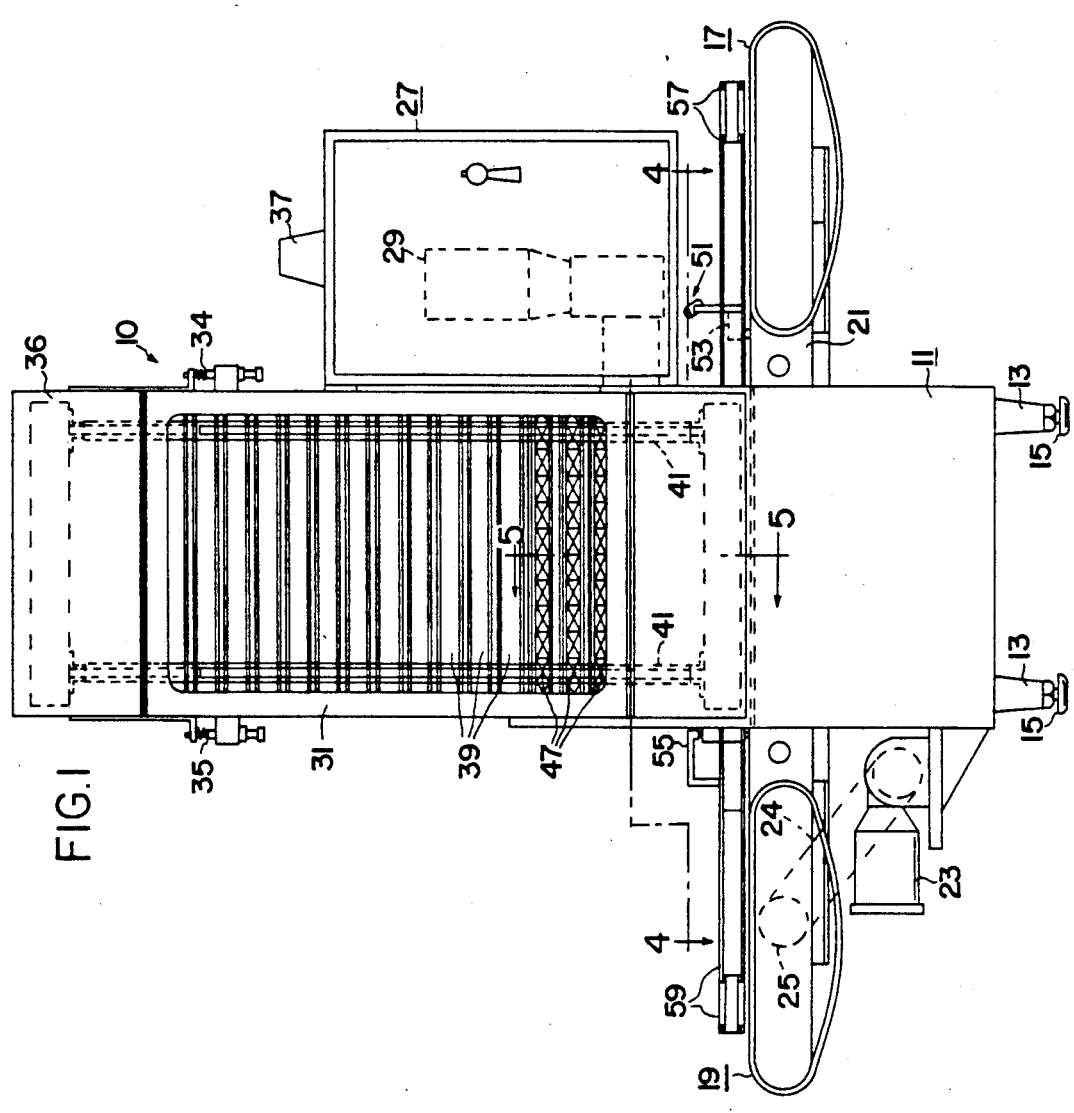
FIG. 1 is a front elevational view of the device of this invention, showing a portable, conveyor line insertable box accumulator in accordance with the present invention.
Figure 5A:
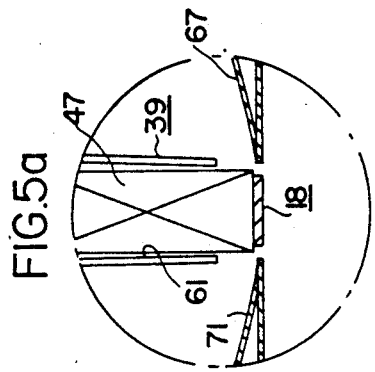
FIG. 5 is an enlarged fragmentary sectional elevational view taken along the line 5, 5 of FIG. 1.

As shown in the drawings, a device 10 for accumulating discrete objects carried between an up stream location and a down stream location is provided. The device includes a frame 11 which is supported on legs 13 and has adjustable feet 15 so as to provide a level and stable positioning of the device adjacent an existing conveyor line between the up stream and down stream operations.

Mounted on the frame is an in feed transfer conveyor means 17, a through conveyor 18, and a discharge transfer conveyor 19, all of which are mounted on horizontal frame member 21. Drive motor 23 and belt 24 are positioned to drive the conveyors 17, 18, and 19, in a connection manner, such as using gear 25 and other linking arrangements.

Operational of the unit is controlled by control unit 27 which contains circuit logic control apparatus such as a programable controller. Motor 29 is shown as being contained within the control unit 27 and is operably connected to drive the accumulator as hereinafter described. Optionally, the motor 29 may be located elsewhere on the frame. Typically, the conveyor drive will be adequately powered if the motor 23 is a ½ horse power electric motor. In most instances, that is adequate power to move objects along the conveyor system. Motor 29, however, is more powerful, such as, for example, a two (2) to about five (5) horsepower electric motor which is used to drive the accumulator, using gears, belts, and the like.

The accumulator is mounted on the frame 11 and has a front panel 31 and inside panels 33. Spring loaded take up means 34 and 35 are positioned near top 36 of the accumulator unit to remove slack from the magazine chains, providing precision location without manual adjustment for chain stretch. Optionally, a flashing light 37 may be mounted on top of the control unit 27 so that the automatic operation can receive operator attention when the device is nearly full.

The front panel and back 31 and side panels 33, form a magazine which encloses a plurality of chambers 39 which are connected to one another with chains 41 which traverses a loop about top gear 43 and bottom gear 45. These gears, 43 and 45, support carrying chains 41 on both ends of chamber 39 and are driven by motor 29 as controlled by control unit 27. Products 47 are stored in the chambers 39, as described hereinafter, when the device functions as an accumulator.

As shown in FIG. 3, an existing conveyor 49 is provided to transfer objects from an up stream operation to a down stream operation. Products traveling along the through conveyor 49 are transferred by in feed transfer conveyor 17 to through conveyor 18, whereby they pass through the magazine 31. Sensor 51 is positioned to provide information to the logic unit of control unit 27. A product positioner input stop 53 intercepts products as they pass from the input transfer conveyor 17 onto the through conveyor 18. Similarly, a product positioner output stop 55 operates to keep products on the conveyor 18 and away from discharge transfer conveyor 19 when it is desired to accumulate product in the magazine 31. In feed guide 57 directs products from through conveyor 49 onto in feed transfer conveyor 17. Similarly, exit guide 59 transfers products from the through conveyor 18 to the discharge transfer conveyor 19 and eventually on to the existing conveyor 49.

Figure 4:
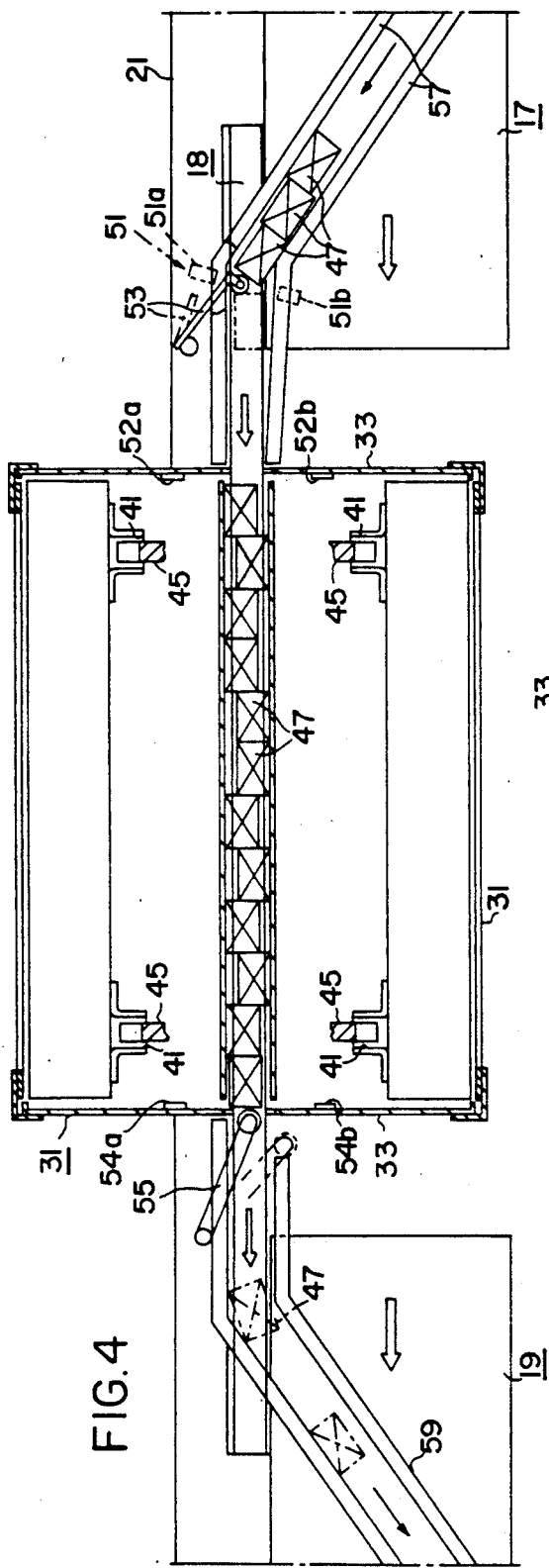
FIG. 4 is an enlarged fragmentary sectional plan view taken along the lines 4, 4 of FIG. 1.

Referring now specifically to FIG. 4, it can be seen that as a package 47 is moved along conveyor 17 and into guide 57, it intercepts the sensor means 51a and 51b which is a pulsed LED sensor. When it is necessary during the operation of the accumulator to halt flow of product in the guide 57, product positioner input stop 53 swings into place between two products 47 as they pass through the sensor beam 51a-51b. A second set of sensors 52a and 52b are provided at the entrance to the magazine 31 to provide information to the logic system, such as that there is no product passing along the conveyor path 18. At the exit of the path through the magazine 31, a pair of sensors 54a and 54b detect the presence or absence of product 47 which might be leaving the magazine 31 on conveyor 18. Product positioner output stop 55 is movably positioned into the path of the objects 47 to prevent the passage of additional object through the accumulator.

Figure 5:
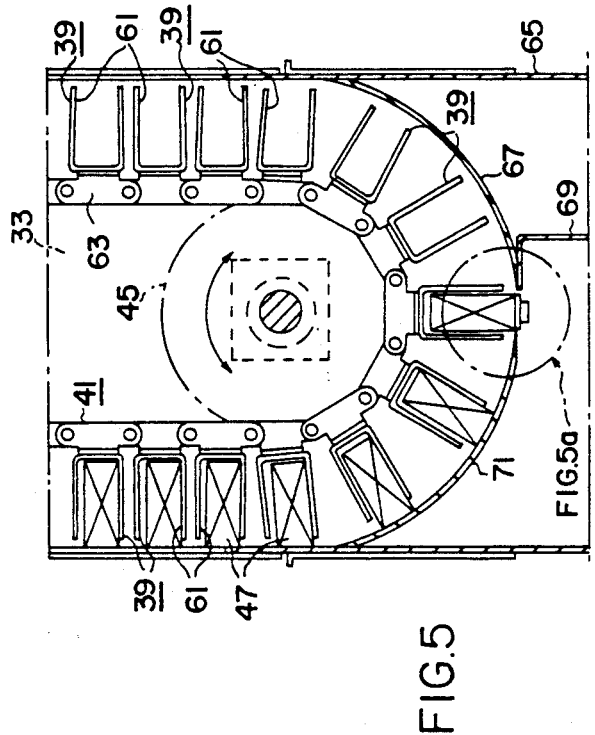

As shown in FIG. 5, individual chambers 39 include a plurality of nests 61 which are held together by linkage 63. Linkage 63 is carried by the chain 41 in a loop around upper and lower gears 43 and 45. Products 47 are carried on their side in nest 61 during the vertical rise of the loop, and the nests are slopped slightly so that vibration will cause the objects 47 to move toward the linkage 63 and away from the opening of the nests 61.

Ideally, the nests 61 are sized to be only slightly larger at their opening than the package 47. As the magazine carries the nests 61 away from the path of the conveyor 18, the nests are moved radially around the constant radius of lower gear 45. When the nests 61 is indexed to move the product 47 away from the conveyor 18, the close tolerances between the size of the nests 61 and the object 47 tends to lift the leading edge of the object 47. At the bottom of the magazine 31, the upright frame 65 supports a curved wall 67 which has an increasing radius as it approaches the conveyor 18 so as to provide a relatively flat portion directly under the support 69. This flat portion 71 cooperates with the constant radius of the indexing gear 45 so that as the nests 61 moves away from conveyor 18, the front edge of the object 47 is listed to avoid catching the curve wall portion 67 of the magazine unit 31. Once the nest 61 has moved sufficiently around the index gear 45, the product lies flat and on its side, so that vibration will tend to move the package 47 inward in the nest to the linkage end 63.

It is intended that, packages 47 will be constantly conveyed through the machine on through conveyor 18. When accumulation is required, stop 53 extends, blocking product flow into the machine. When the carrier clears product as evidence by the sensor 54, stop 55 enters the path 18 and stop 53 retracts to allow a group of product 47 to enter the carrier. Sensor 51 counts the number of products entering the accumulator and stop 53 closes the path 18 again when the desired number of products 47 have entered the magazine 31. The quantity of products 47 contained in the accumulator 31 are associated with a specific nest 61. The magazine 31 then indexes the chamber 39 including the products 47 to store the packages and present a fresh chamber with an empty nest in position to receive additional product. Once again, stop 53 and the sensors 51 and 52 cooperate to allow a specified number of products 47 into the chamber 39 since each nest 61 has its own quantity of product 47 associated therewith. At this point, the magazine 31 indexes again and the cycle continues to repeat until a sufficient quantity of products have been accumulated in the machine.

To unload the device, stop 53 extends one again into the path 18 to interrupt or halt product flow. When the carrier that is presently in position has been cleared of product, as shown in sensor 54, the magazine indexes to place packages on to the conveyor path 18. Stop 55 then is opened and sensor 54 verifies that all of the products have left the carrier. This cycle repeats until as much of the product contained in accumulator 31 has been withdrawn as is necessary. Depending upon up stream and down stream operating conditions, the unit functions to store and/or retrieve packages in the accumulator 31 as needed.

In a preferred embodiment, the machine is operated in an first in, first out vertical storage accumulator mode. In one example, the accumulator magazine has 44 chambers that each hold 12 products in individual nests for a total capacity of 528 products. Operating at 75 objects per minute of accumulation, this allows for 7 minutes of accumulation.

The accumulator of the present invention may be operated as a "stand alone" machine which can be placed along side and existing conveyor as shown in the drawings. The guides 57 and 59 interface with the on going conveyor 49 as previously described. The control unit 27 is then programed to respond to changes of condition in both up stream and down stream operation. Information can be perceived by an operator who is manually controlling the machine, or can be electronically senses and processed by programed controllers. The accumulator can be directly incorporated into the assembly line using conveyors 17 and 19 so that it is integral rather than stand alone.

The normal flow of product 47 is from the through conveyor 49, across the in feed transfer conveyor 17, through the accumulator magazine 31 on conveyor 18, back across the discharge transfer conveyor 19 and once again on to the through conveyor 49. The alternative embodiment uses the up stream discharge onto in feed conveyor 17 and discharge transfer conveyor 19 feeds the input or the down stream unit.

The magazine 31 loads and unloads product 47 from the through conveyor 18 by indexing the chambers 39 which are carried in the magazine. The indexing is one movement clockwise, for example, to position the next chamber adjacent the conveyor 18. The magazine rotates the chambers, either clockwise or counter clockwise as programed, when changing from a load to an unload mode or from an unload to a load mode. In order to operate as a first in, first out operation, the magazine is programed to be in the unload mode unless it is empty. When accumulation is required, the unit shifts to the load mode.

When the down stream machine is running and if a backup sensor senses the absence of product on the interior path of the magazine, the unload cycle of the accumulator begins. Product input stop 53 extends in order to block product flow through the magazine chamber. After approximately, three seconds, when the product has cleared the nests in this chamber and the exit sensor 54, product output stop 55 is extended and the magazine 31 indexes one chamber 39 clockwise. Both stops 53 and 55 retract, releasing product flow. The cycle can repeat after an adjustable preset time to regulate the rate of discharge and to allow the product to clear the magazine chamber and the stop 55.

It is possible to provide preset timers which operate under difference circumstances. One timer might be employed when both the up stream and down stream machines are running so as to release accumulated product at the differential rate of the down stream rate minus the up stream rate. Whether this number is positive or negative, as long as there is product and space in the accumulator, the difference between the down stream and up stream rates can be accommodated.

A second timer might be employed, again using the discretion of the operator or programed into the programable controller, when the down stream machine is running and the up stream machine is stopped. This timer would then release product at a rate which matches the consumption of the down stream machine. The unload cycle will continue to repeat until the magazine is empty or, until the up stream machine again operates, and/or until accumulation is required.

In the event that the down stream machine stops or if sensors have been provided which sense the presence of a product backup, the accumulator shifts to a load mode. Product input stop 53 extends to block product flow through the accumulator magazine 31. After approximately three seconds have passed for the product to exit past the sensor 54 and product positioner output stop 55, the magazine traverses to position the last chamber which has been loaded one pitch clockwise from the transfer position. The machine can be programed so that if the magazine is half full or more, it traverses clockwise and if the magazine is less than half full it traverses counterclockwise. When the proper empty chamber and empty nest is in position, the load cycle commences.

The load cycle begins by retracting the input stop 53 and counting the appropriate number of products using sensor 52. If there are 12 nests in a chamber, 12 products will be counted. Input stop 53 then re-extends to halt input of product after the proper count has been achieved. A one second delay is included to insure that all the product is at rest. If safety sensors indicate that no product has fallen or blocked the path, the magazine indexes one chamber clockwise. The indexing step takes about one second and as soon as the chamber is at rest, the cycle can repeat and can continue to repeat as long as accumulation is required or until all of the chambers of the magazine are full.

The device which as been shown in FIG. 1-6c is arranged as a vertical accumulator. This has significant advantages since, at the present time, there is no commercially effective vertical accumulator, particularly when a first on first off system is desired. Typically, when aseptic packages are filled, it is essential that the flow of product be continuous. Accordingly, the filling unit cannot stop even when there is a problem down stream with the labeling, packaging, or other functions. When the accumulator of the present invention shifts between a load mode and an unload mode, the magazine rapidly traverses the carrier to a position where the stored product is available for unloading in the order which the carriers were filled. When the unit is cycling between load and unload conditions, each time it shifts from load to stop or unload, the rapid indexing of the first full carrier to the position adjacent the unload function is made. In this manner, the unit is ready to operate.

First in first out operation is particularly important when the freshness of the product is of concern, such as before final sealing or when the product is to be refrigerated or frozen after being packaged. Unless first in first out accumulation is used, the stored product is at risk to spoilage.

The device of the present invention is admirably suited for use in manufacturing facilities where space, and particularly floor space, is at a premium. One unit, which might be six feet long, three feet wide, and eighteen feet tall, is functionally the equivalent of 1,000 linear feet of floor space. The products are safely stored in individual nests and because the indexing of the carriers allows tall objects to be placed on their side, a most efficient use of vertical space is achieved. The device is smooth in operation since the products are at rest when the individual nests are indexed or rotated with the carriers to remove the product from the conveyor.

In the embodiment shown in FIGS. 3, 4 and 6a, b, and c, the change in direction caused by the in feed guide 57 and exit guide 59 allow the product position input stop 53 to contact and actually physically displace the last object 47 to enter into the carrier. The change in angle provides a gap through which the sensor "sees" the presence or absence of product in counting the product. As shown in FIG. 6a, for example, product positioner input stop 53 interacts with a gap between products 47a and 47b which is larger than it would be on a straight path. Thus it is easy to have the stop move into the gap before the next box arrives or to create a gap by displacing the passing product. The input guide 17 is shaped to permit sideways displacement of the product 47 by the stop 53, which compensates for variations in conveyor speeds, product size and other variables.

In another embodiment, shown in FIGS. 7 and 8, a horizontal accumulator is shown. Again, the accumulator automatically stores and retrieves packages from the through conveyor as required. This accumulator can also insert groups of stored product into the line when both up stream and down stream operations are running, as can be previously described as vertical accumulator version of the present invention.

Shown in FIG. 7 and 8, all that is really different is that the magazine 31" is oriented in the horizontal position rather than the vertical position. Chambers 39' store product 47' in the same manner as previously described. Packages are conveyed through the machine on a conveyor comprising an inlet conveyor 17', a through put conveyor 18' and an exit conveyor 19'. A stop 53' extends, blocking product flow when accumulations is required. When the carrier 39' clears, stop 55' extends and stop 53' retracts to allow a group of product to enter the carrier. After the correct count has entered the carrier, stop 53' extends once again to hold back the product line. The magazine indexes and the cycle repeats.

To unload, stop 53' extends, blocking product flow through the machine. When the carrier 39' clears, the magazine indexes to move the next carrier on to conveyor 17; stop 55 then retracts to allow the product to escape. Input and Output is controlled by up stream and down stream operating conditions.

Having thus described the invention, what is claimed is:

1. A system for storing or accumulating object comprising:
   a housing;
   conveyor means including an inlet conveyor section for conveying objects in abutting end to end fashion along a predetermined path through said housing;
   a magazine means in said housing having a plurality of chambers selectively positionable in operating relationship to said path for storing rows of products in said chambers;
   control means regulating the flow of objects along said path for selectively permitting the direct flow of objects through the housing or interruption of said flow to store objects in said chambers;
   gap forming means in said inlet conveyor section for creating a geometric offset gap between adjacent products; and
   stop and sensing means located adjacent said gap forming means to permit counting of objects and selectively stopping flow of objects via said gap into the housing.

2. The system of claim 1 wherein said magazine means further includes indexing means to define a next to load position and a next to unload position for said chambers.

3. The device of claim 2 which further includes controller means for selectively positioning a particular carrier at the next to unload position.

4. The device of claim 3 wherein said controller means is adapted to selectively position the first loaded chamber at the next to unload position.

5. The device of claim 1 which further includes guide means in operable relationship with said stop means, said guide means including an input guide and input stop, said input guide providing an angular deviation in said path at the operating location of said input stop to permit said stop to block flow of product regardless of the location of the individual product being stopped.

6. The device of claim 1 wherein said object nest include an elongated u shaped member having an open end facing said path when said nest and the chamber in which it is included is in operable relationship with said path.

7. The device of claim 1 wherein said magazine means includes a plurality of chambers mounted on carrier loop means having vertically aligned rotatable support means to define a closed loop path for said chambers, said chambers being movable into operable relationship with said path from either side of said path by rotation of said support means.

8. The device of claim 7 wherein said rotatable support means are adjustably movable clockwise and counter clockwise with respect to the entrance to said path.

9. The device of claim 1 which further includes means for detecting product flow on said path.

10. The device of claim 9 wherein said sensor means is adapted to detect flow of product into said entrance.

11. The device of claim 9 wherein said sensor means is adapted to detect the flow of product out of said exit.

12. The device of claim 9 wherein said sensor means is adapted to count the number of object passing a predetermined point on said path.

13. The system of claim 1 which further includes guide means in operable relationship with said stop means, said guide means including an input guide and input stop, said input guide providing an angular deviation in said path at the operating location of said input stop to permit said stop to block flow of product regardless of the location of the individual product being stopped upon command.

14. The system of claim 1 wherein said controller means is adapted to selectively position the first loaded chamber at the next to unload position.

15. The system of claim 1 wherein said object nests each include an elongated u-shaped member having an open end facing said path when said nests and the chamber in which it is included is in operable relationship with said path.

16. The system of claim 1 wherein said magazine means includes a plurality of chambers mounted on a carrier loop means having vertically aligned rotatable support means to define a closed loop path for said chambers, said chambers being movable into operable relationships with said path from either side of said path by rotation of said support means.

17. The system of claim 1 wherein said sensor means is adapted to detect flow of product into said entrance.

18. The system of claim 1 wherein said sensor means is adapted to detect the flow of product out of said exit.

19. The system of claim 1 which further includes means for detecting product flow on said path.

20. The system of claim 19 wherein said sensor means is adapted to detect flow of product into said entrance.

21. The system of claim 1 which further includes guide means in operable relationship with said stop means, said guide means including an input guide and input stop, said input guide providing an angular deviation in said path at the operating location of said input stop to permit said stop to block flow of product regardless of the location of the individual product being stopped.

22. The system of claim 19 wherein said sensor means is adapted to detect the flow of product out of said exit.

23. The system of claim 19 wherein said sensor means is adapted to count the number of object passing a predetermined point on said path.

24. A system for storing or accumulating objects comprising:
a housing;
conveyor means including an inlet conveyor section for conveying objects in end to end fashion along a predetermined path through said housing;
a magazine means in said housing having a plurality of chambers selectively positionable in operating relationship to said path for storing rows of products in said chambers;
control means regulating the flow of objects along said path for selectively permitting the direct flow of objects through the housing or interruption of said flow to store objects in said chambers;
said chambers defined by elongated U-shaped nests for objects wherein the objects can be loaded in end to end fashion when a nest is overlying and aligned with said conveyor means,
means defining arcuate walls on either side of said conveyor having an increasing radius approaching the conveyor to define a relatively flat transfer section; and to control entrance and exit of articles relative to the U-shaped nest.

25. A system as claimed in claim 24 wherein the side walls defining a nest converge inwardly towards one another at the open end so that products tend to seat at the bottom of the nest when the nest move to a generally horizontal position.

* * * * *